W. H. HENDERSON.
AUTOMOBILE TIRE TREAD.
APPLICATION FILED SEPT. 25, 1915.
1,189,569.
Patented July 4, 1916.
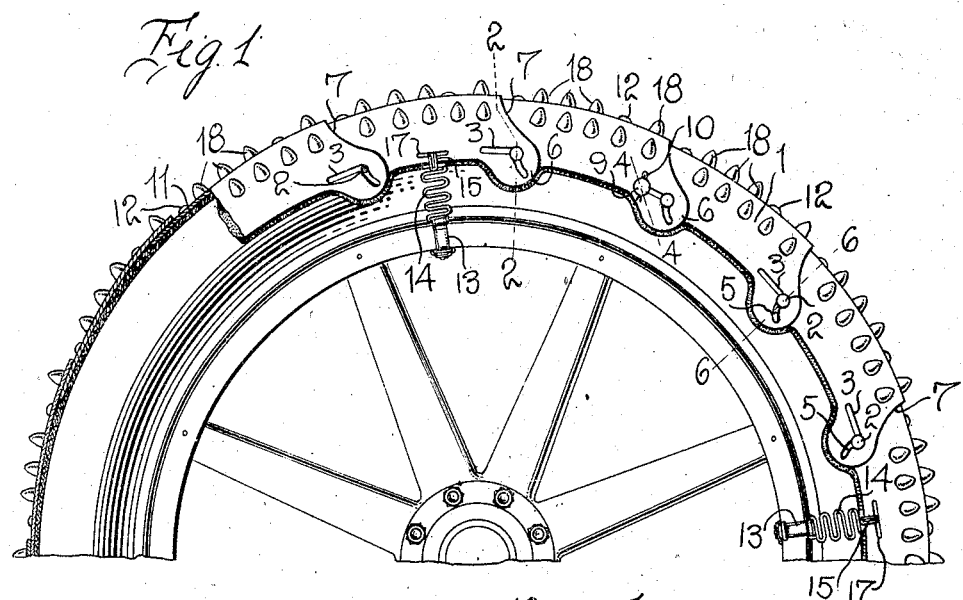
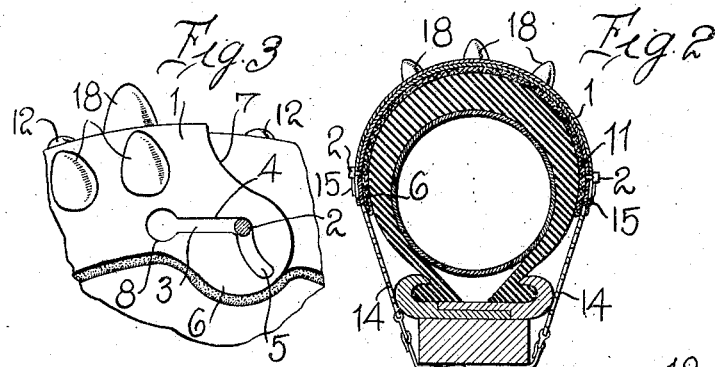
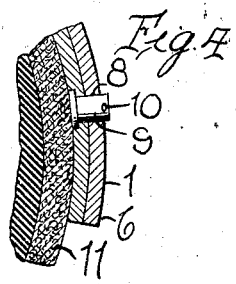
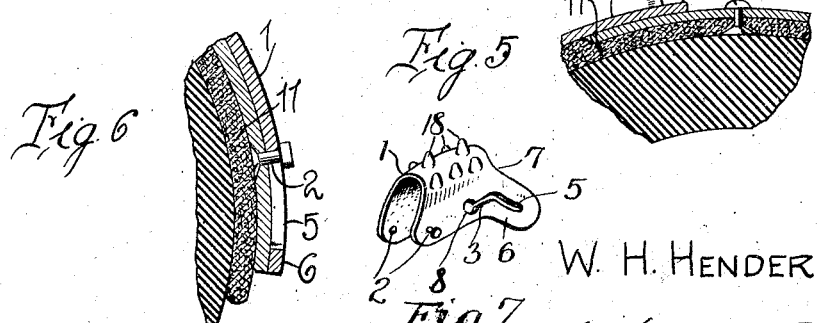
Inventor
W. H. HENDERSON
By Watson E. Coleman
Attorney

UNITED STATES PATENT OFFICE.

WILLIAM H. HENDERSON, OF OMAHA, NEBRASKA.

AUTOMOBILE-TIRE TREAD.

1,189,569.   Specification of Letters Patent.   Patented July 4, 1916.

Application filed September 25, 1915. Serial No. 52,588.

*To all whom it may concern:*

Be it known that I, WILLIAM H. HENDERSON, a citizen of the United States, residing at Omaha, in the county of Douglas and State of Nebraska, have invented certain new and useful Improvements in Automobile-Tire Treads, of which the following is a specification, reference being had to the accompanying drawings.

This invention comprehends certain new and useful improvements in detachable treads for tires of automobiles, motor vehicles, and the like, and relates particularly to a metallic tread of this character constructed in a plurality of sections movably connected together and designed to extend circumferentially around the tire, and be detachably held thereon.

The invention has for its primary object a durable and efficient construction of automobile tire tread, the parts of which are so arranged and movably connected together that the tread will yield in every required direction with the tire and in no wise detract from the resilience thereof, while at the same time the tread will protect the tire from wear to a maximum degree, as well as from punctures, and increase the life and service of the tire to a considerable extent.

The invention has for a further object an improved tire tread of this type, the parts of which are so formed and arranged that the tread may be very quickly applied to a tire and quickly removed therefrom when desired, and wherein the sections of the tread are preferably provided with knobs or protuberances of substantially hemispherical form, which will impart the desired tractive effect or action, as well as prevent skidding and spinning of the wheels and which will at the same time not be liable to become packed with mud, ice or snow.

A still further object of the invention is a metallic sectional automobile tire tread provided with improved means whereby it may be securely, yet removably, held on the tire, said means including yieldable members that are designed to extend around or across the felly of the wheel and tend to compress when the tire yields or becomes partially deflated, whereby the improved tread will be at all times maintained in proper position on the tire. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which—

Figure 1 is a side view of a portion of a wheel equipped with my improved detachable tire tread, parts being broken away. Fig. 2 is a transverse sectional view through the tire, the section being taken approximately on the line 2—2 of Fig. 1. Fig. 3 is a detail or fragmentary view illustrating on a larger scale the movable connection between the two adjacent tread sections. Fig. 4 is a fragmentary section on the line 4—4 of Fig. 1. Fig. 5 is a similar view showing one of the rivets for holding the felt or similar lining in place, and Fig. 6 is a detail section on the line 6—6 of Fig. 1.

Corresponding and like parts are referred to in the following description and designated in all of the views of the accompanying drawing by like reference characters.

My improved detachable tire tread is made up of any desired number of preferably metallic sections 1, of transversely bowed form, as shown, and of any desired size, both transversely and longitudinally considered, as the requirements of the case may demand, each section being at least of a length to exceed that part of the tire that is in contact with the ground when the tire is fully inflated, whereby should the tire run flat, the tire will not mash down over the ends the shields or sections 1 and be injured by them. The shields or sections 1 extend circumferentially of the tire, as clearly illustrated in Fig. 1, and overlap at their ends, each section being formed at both sides in its underlying end with apertures to receive rivets or pivot members 2, and the overlying ends of adjacent sections are formed with angular slots 3 receiving and accommodating the rivets 2, said slots being preferably each composed of a straight portion 4 terminating at one end in a preferably curved portion 5, whereby the required hinged movement between the sections will be provided for, and the sections yield and move readily in an articulate manner, both circumferentially and radially, so as to compensate for all shocks and the like that are imposed upon the tire in service. Preferably the slots 3 are formed in enlarged ends 6 on the shields or sections 1, and the latter are formed at their ends with transversely curved recesses or cut-away members 7, whereby to facilitate the necessary hinging movement.

One shield or section 1 has its slots 3 formed at one end with enlargements 8, as best illustrated in Fig. 3, said enlargements being sufficient to allow the heads of the rivets or pivot members 2 to pass therethrough, and it will thus be understood that the tread is disconnected and fastened in place at these points, all of the other sections being preferably permanently connected together as hereinbefore described. To apply the tread to a tire, the latter is partially deflected, and the tread passed around the tire in an evident manner, and the heads of the rivets 2 at the then open or disconnected portion of the tread are passed through the enlargements 8 and into the slots 3, in which said enlargements are formed, whereupon plugs 9 are inserted up through the enlargements 8 that are preferably counter-sunk on their inner sides, said plugs being held in place in any desired way, as by cotter pins 10, and it will thus be seen that the tread will thereby be held in place upon the tire. Preferably each shield or section 1 has a lining 11 of felt or the like, secured to its inner face by rivets 12 of any desired construction, such as will be not liable to tear out or injure the tire or felt, these linings tending to prevent the tire from becoming hot or from other injury by the use of the tread.

The tread may be secured upon the tire in any desired way, in addition to the means hereinbefore described. In the present embodiment of the invention, I have shown clamping members, each of which consists of a strap 13 designed to extend across the felly of the wheel and be secured thereon by buckles or the like, said straps being connected to springs 14 that are provided at their outer ends with hooks 15 designed to engage in circumferential slots 17 formed in some of the sections, the springs tending to compress and thereby at all times exerting a strain in an inward radial direction which will result in snugly holding the tread in position, even though the tire should become partially deflected in use or receive some violent shock which will tend to unduly depress it at any point. Any desired number of these clamping members may be employed, within the purview of my invention.

Preferably each shield or section 1 is provided with any desired number of preferably hemispherical knobs or protuberances 18 which will prevent skidding and spinning of the wheels in quick starting, hard pull, or a hill climb, and as these knobs are substantially hemispherical in form, as above stated, it is obvious that they will not be liable to become clogged with mud, ice or snow.

From the foregoing description in connection with the accompanying drawing, it will be seen that I have provided a very durable and efficient construction of detachable tire tread in which the shields or sections are so connected together that the tread will yield both radially and circumferentially, as required in the service of the tire, so that the device will not detract in any way from the resilience of the tire, while at the same time it will fully protect it and increase its longevity in service to a maximum degree.

In the preferred manufacture of this device, the inside diameter of the metallic tread when coupled together at the ends, and the rivets are drawn up into their respective corners of the slots 3 and 5, should be approximately one-quarter of an inch less than the outside diameter of the tire when fully inflated, so that the tread will be held firmly in place on the tire by the pressure of the air on inside of same, for when a heavy automobile is being propelled forward, by the adhesion of the tread and contact with the ground, there will be a great tendency for the tread to slip circumferentially on the tire. The springs 14 and straps 13 should not be depended upon to hold the tread upon the tire. All they are intended for is to draw the tread up to the tire in case the tire loses air.

Rivets or pivot members 2 must be solidly, firmly, and in a fixed manner, secured in the underlying shields and must be large enough in diameter to give strength to the tread, for manifestly the tread can only be as strong as the rivets are. There must be just enough play between the heads of the rivets and the upper sides of the overlapping shields, and just enough play between the sides of the rivets and the edges of the slots 3, to permit the rivets to travel smoothly and freely in either direction within the slots. These rivets are preferably so disposed that they will lie at the juncture of the slots 3 and 5, as shown in Fig. 1 and more clearly in Fig. 3. By positioning the rivet at this point the two shields are adapted to move circumferentially as well as radially and by means of this rivet are always maintained in their coöperative relation irrespective of the condition of the tire, whether inflated or deflated. This rivet provides a pivotal connection between the adjacent shields so that if one end of the shield meets an obstruction on the road, tending to depress that shield upon the tire, it will move inwardly and the rivet will also move inwardly toward the rim of the wheel. As the rivet which is connected to one of the sections moves inward, this rivet tends to ride in the arcuate slot 5 and thus maintain the separate shields together. In meeting an ordinary obstruction the rivets lying at the juncture of the two slots, allow each shield to rotate around the axis of that rivet. The circumferential slot tends to allow for any creeping action of the shields. If the rivets are not stationary in the underlying shields, they will bind and refuse to travel the full length of the slots.

In order to more easily couple the shields together, two of them may be provided with recesses 8 formed at one end of the slot 3. One or more of the shields may be made of less length than the regular one or usual length so that variations in the diameters or circumference of tires will not affect the use or application of the assembled shields. These shorter sections are identical in construction with the regular shields only in that they have a recess 8 formed at one end of the slot 3, as shown in Fig. 1. Thus the coupling shields provide a method whereby variations by fractional parts of an inch may be readily taken care of and a complete tread formed of assembled shields. By means of these coupling shields, anyone, not necessarily a machinist, can slip in a long or short one to obtain the desired tread length.

In order to apply the tread to a tire, it will be coupled together with a coupling shield to make the desired size of inside diameter of tread. Then, the plugs 9 are slipped into place up through the enlargements 8 and secured with cotter pins 10, the wheel is then jacked up, the inside of the tread is hung onto the wheel, the tire then deflated until the tread will slip over it all around, and then the tire is inflated about half its predetermined maximum capacity, and the straps buckled firmly around the felly of the wheel. Then the tire is fully inflated, and the springs 15 will then be distended and will have power to draw the tread up should the tire lose air.

While the accompanying drawing illustrates what I believe to be the preferred embodiment of my invention, it is to be understood that the invention is not limited thereto, but that various changes may be made in the construction, arrangements and proportions of the parts without departing from the scope of the invention as defined by the appended claims.

What is claimed, is:

1. A tire tread of the character described comprising a plurality of shields arranged in overlapping relation to each other and having a closed angular slot formed in each of the overlapping portions, each one of said slots including a straight portion extending circumferentially and another portion connected thereto of arcuate form curving inwardly toward the rim of the wheel and toward the adjacent end of the overlapping section, and pivot members secured to the respective underlying shields at one end of the same, each one being freely movable in each one of said slots, said pivot members being normally positioned at the juncture of the straight and the arcuate portions of the slot.

2. A tire tread of the character described comprising a plurality of circumferentially extending transversely curved sections arranged in overlapping relation to each other at their ends, each section being provided at both sides in its overlapping portion with a closed angular slot, the overlapping portion comprising a substantially semi-circular projection in which the slot is located, said slot including a circumferentially extending straight portion and another portion of arcuate form curving inwardly toward the rim of the wheel and toward the adjacent end of the overlapping section, and pivotal members secured to the underlying portions of the sections and each freely movable in the slot of the overlapping portions, the normal position of each of said pivotal members being at the juncture of the two portions of the slot to permit the sections to move relative to each other.

3. A tire tread of the character described comprising a plurality of circumferentially extending curved sections, said sections being substantially semi-circular in form and arranged in overlapping relation to each other at their ends, the overlapping portions of each section being formed with a closed angular slot, one portion of said slot extending circumferentially and another portion connected thereto of arcuate form and curving inwardly toward the rim of the wheel and toward the adjacent end of the overlapping section, and a pivotal member to connect each of said sections together and freely movable in one of said slots, each one of said pivotal members being normally positioned at the juncture of the two portions composing the slot.

4. A tire tread of the character described comprising a plurality of circumferentially extending, transversely bowed sections arranged in overlapping relation to each other, at their ends, each section being provided at one end with a slot including portions angularly positioned with reference to each other, one portion of said slot having straight sides extending circumferentially, the other portion of said slot being arcuate in form and curving inwardly toward the rim of the wheel and toward the adjacent end of the overlapping section, certain of the sections being provided with an enlargement at the end of the first named portion of the slot to permit the assembly of the sections as a continuous tread, a retaining plug coöperating with the enlargement and provided with fastening means to prevent its accidental withdrawal, the several portions of the slot being continuous with each other and with the enlargement, and a pivot member carried by each one of the sections to coöperate with each one of the slots, said pivot member being normally positioned at the juncture of the two portions of the slot.

In testimony whereof I hereunto affix my signature in the presence of two witnesses.

WILLIAM H. HENDERSON.

Witnesses:
LOTTIE W. MARTIN,
GEORGE A. MAGNEY.